(12) United States Patent
Yokoyama

(10) Patent No.: US 7,680,466 B2
(45) Date of Patent: Mar. 16, 2010

(54) COMMUNICATION DEVICE

(75) Inventor: Yukihiko Yokoyama, Tokyo (JP)

(73) Assignee: NEC Corporation, Tokyo (JP)

( * ) Notice: Subject to any disclaimer, the term of this patent is extended or adjusted under 35 U.S.C. 154(b) by 661 days.

(21) Appl. No.: 11/075,301

(22) Filed: Mar. 8, 2005

(65) Prior Publication Data

US 2005/0197075 A1    Sep. 8, 2005

(30) Foreign Application Priority Data

Mar. 8, 2004    (JP)    ............... 2004-063730

(51) Int. Cl.
H04B 1/38    (2006.01)
(52) U.S. Cl. .............. 455/90.3; 455/73; 455/575.1
(58) Field of Classification Search .......... 455/90.3
See application file for complete search history.

(56) References Cited

U.S. PATENT DOCUMENTS 7,139,531 B2 * 11/2006 Iwahashi et al. ............ 455/73

FOREIGN PATENT DOCUMENTS

| JP | 03-117888 | 12/1991 |
|---|---|---|
| JP | 06-252802 | 9/1994 |
| JP | H08-116294 A | 5/1996 |
| JP | 09-008481 | 1/1997 |
| JP | H10-256761 A | 9/1998 |
| JP | P2865167 | 12/1998 |
| JP | 11-298180 | 10/1999 |
| JP | 2004-140820 | 5/2004 |
| JP | 2004-235840 | 8/2004 |

* cited by examiner

*Primary Examiner*—Duc Nguyen
*Assistant Examiner*—Ajibola Akinyemi
(74) *Attorney, Agent, or Firm*—Scully, Scott, Murphy & Presser, P.C.

(57) ABSTRACT

To eliminate the necessity of providing a special heat insulating structure or heat resisting properties and to simplify wiring. A modulation/demodulation unit, transmission/reception units of active and standby transmission systems, branching units of active and standby transmission systems, and a line switching and monitor control unit are accommodated in one casing. The modulation/demodulation unit and the line switching and monitor control unit, commonly used in the active and standby transmission systems, are incorporated in the lower part of the casing, and the transmission/reception units and the branching units of the active and standby transmission systems are incorporated in the upper part of the casing. The transmission/reception units and the branching units of the active and standby transmission systems are arranged in parallel such that the branching units are positioned at the center thereof.

6 Claims, 4 Drawing Sheets

COMMUNICATION DEVICE

BACKGROUND OF THE INVENTION

1. Field of the Invention

The present invention relates to a communication device composed of a plurality of units, and in particular, to the mounting structure of the respective units.

2. Related Art

FIG. 1 is a layout diagram of respective. units in a conventional communication device. FIG. 2 is a schematic perspective view of the conventional communication device. Hereinafter, explanation will be given based on these Figures.

A conventional communication device 50 is so configured that two transmission/reception units 521 and 522 of transmission systems for performing transmission and reception with the same polarized wave, a modulation/demodulation unit 54, two branching units 531 and 532, and line switching and monitor control unit 55 are accommodated in one casing 51.

Next, the arranging relationship among these units will be described. The transmission/reception units 521 and 522 and the branching units 531 and 532, consisting of components which differ depending on the selected radio frequency, are arranged in the upper part of the casing 51, and the modulation/demodulation unit 54 and the link switching and monitor control unit 55, consisting of the same components irrespective of the radio frequency, are spaced apart from each other and arranged in the lower part of the casing 51.

Further, one branching unit 531 is electrically connected to one transmission/reception unit 521 via a transmission signal line 561, and is electrically connected to the other transmission/reception unit 522 via a reception signal line 571. The other branching unit 532 is electrically connected to the other transmission/reception unit 522 via a transmission signal line 562, and is electrically connected to the one transmission/reception unit 521 via a reception signal line 572. Such a communication device 50 is disclosed in, for example, the Japanese Patent Application Laid-open No. 08-116294 (hereinafter referred to as Patent Document 1).

Here, consideration will be made for the reason why a plurality of units are arranged to be in an arranging relationship shown in FIG. 1. In the initial stage of developing this kind of communication device, the transmission/reception units 521 and 522 were large in their structure. Therefore, a communication device might have either an arrangement that the transmission/reception units 521 and 522 are placed above and the branching unit 531 and 532 are placed below as shown in Patent Document 1, or an arrangement that the transmission/reception units 521 and 522 are placed below and the branching unit 531 and 532 are placed above as shown in FIG. 1. Next, the arranging relationships shown in FIG. 1 and Patent Document 1 will be compared. When comparing the transmission/reception units 521 and 522 and the branching units 532 and 532, maintenance is performed less frequently for the branching units 531 and 532. Accordingly, considering from an aspect of maintenance, the arranging relationship shown in FIG. 1 where the transmission/reception units 521 and 522 are placed below and the branching units 531 and 532 are placed above, is most appropriate, comparing with that of Patent Document 1.

However, in the arranging relationship shown in FIG. 1, the branching units 531 and 532 are placed above the transmission/reception units 521 and 522 with high heating values, whereby the branching units 531 and 532 are exposed to the heat of the transmission/reception units 521 and 522. Therefore, it is required to take such countermeasures as addition of discharging items to the transmission/reception units 521 and 522 or easing of specification circumstance. This leads to a cost increase and a weak product competitiveness.

In order to avoid such a situation, the transmission/reception units 521 and 522 and the branching units 531 and 532 may be arranged in parallel. However, considering the mounting area of the casing 51, it is impossible to enlarge the size of the casing 51. Therefore, it is the current situation that measures against heat must be taken by considering the arranging relationship of the units while keeping the current size of the casing 51.

Further, in the case of the arranging relationship between the transmission/reception units 521 and 522 and the branching units 531 and 532 shown in FIG. 1, the lengths of the transmission signal lines 561 and 562 and the reception signal lines 571 and 572, extending from the branching units 531 and 532 to the transmission/reception units 521 and 522 respectively, are different, whereby a difference of cable loss is caused, which causing a problem that a signal delay occurs between the active transmission system and the standby transmission system. Further, cabling between the active transmission system and the standby transmission system becomes complicated, causing a problem of the high manufacturing cost.

SUMMARY OF THE INVENTION

It is therefore an object of the present invention to provide communication devices in which the conventional problems are solved.

Nowadays, transmission/reception units are miniaturized due to a development in semiconductor devices. The present invention is characterized in that, by using miniaturized transmission/reception units, a plurality of units are built in a casing of the current size while measures against heat are taken by the arranging relationship. Further, the present invention is characterized in that a problem relating to wiring is solved by using the arranging relationship for measures against heat.

In order to achieve such an object, a communication device of the present invention comprises, in a casing: a modulation/demodulation unit having a modulating function for modulating and converting an input baseband signal into an intermediate frequency signal, and a demodulating function for demodulating and converting an intermediate frequency signal into a baseband signal; transmission/reception units of an active transmission system and a standby transmission system, each of which has a transmitting function for converting an intermediate frequency signal from the modulation/demodulation unit into a radio frequency signal and supplying it to an antenna, and a function of converting a radio frequency signal into an intermediate frequency signal and outputting it to the modulation/demodulation unit; branching units for separating a desired radio frequency from an allocated radio frequency and performing provision and reception of a signal with the transmission/reception units; and a line switching and monitor control unit having a line switching function for performing line switching between the active transmission system and the standby transmission system, a line control function for monitoring a line and controlling a switching operation of a line switching part corresponding to the monitored state, and a monitoring function for monitoring and displaying the state of an apparatus. The modulation/demodulation unit and the line switching and monitor control unit, commonly used in the active transmission system and the standby transmission system, are incorporated in the lower part of the casing, and the transmission/reception units and the branching units of the active transmission system and the standby transmission system are incorporated in the upper part of the casing. The transmission/reception units and the branching unit of the active and standby transmission systems are arranged in parallel such that the branching units are positioned at the center thereof.

In general, transmission/reception units have high heating values, and branching units have low heating values. In the present invention, the transmission/reception units of the active transmission system and the standby transmission system and the branching units of the active transmission system and the standby transmission system are incorporated in the upper part of the casing. Further, the transmission/reception units and the branching units of the active and standby transmission systems are arranged in parallel such that the branching units are positioned at the center thereof. Therefore, the branching units will never be exposed to the heat generated by the transmission/reception units. This enables to prevent the characteristics of the branching units from being changed by the heat.

The size of transmission/reception units can be miniaturized when the components consist of semiconductor devices. In the present invention, the transmission/reception units of the active transmission system and the standby transmission system are units comprising components which differ depending on the selected radio frequency, and the components consist of semiconductor devices. Therefore, it is possible to incorporate the branching units and the transmission/reception units in the upper part of the casing with an arranging relationship in which measures against heat are taken, without increasing the current size of the casing.

Further, in the present invention, the transmission/reception units of the active transmission system and the standby transmission system are used with the branching units arranged vertically, all of which are incorporated in the upper part of the casing, and the transmission/reception units and the branching systems of the active and standby transmission systems are arranged in parallel such that the branching units are positioned at the center thereof. Therefore, it is possible to surely prevent the branching units of, the active transmission system and the standby transmission system from being affected by the heat generated from the transmission/reception units of the active transmission system and the standby transmission system.

Further, in the present invention, the transmission/reception units and the branching unit of the active and standby transmission systems are arranged in parallel such that the branching units are positioned at the center thereof, so that wiring routes formed between the branching units and the transmission/reception units are set to have the shortest length. Therefore, a signal delay caused between the active transmission system and the standby transmission system can be solved.

Further, connectors are arranged at positions where the wiring routes formed between the branching units and the transmission/reception units have the shortest length. This makes wiring processing easy.

According to the present invention, air heated by the transmission/reception units do not adversely affect the branching units, whereby no special heat insulating structure or heat-resisting property is required. When a branching unit is connected to each of the two transmission/reception units via a signal line, the length of the signal line becomes the shortest by arranging the branching unit between the transmission/reception units. Thereby, the wiring can be simplified.

As described above, the present invention enables to suppress temperature rise and to improve mounting efficiency and to realize wiring not causing a cable loss to the active system and the standby system, while the transmission/reception units, the branching units, the modulation/demodulation unit, the line switching and monitor control unit and the like are accommodated in one casing. Further, by simplifying cabling, it is possible to improve manufacturing easiness.

PREFERRED EMBODIMENT OF THE INVENTION

Figure 1:
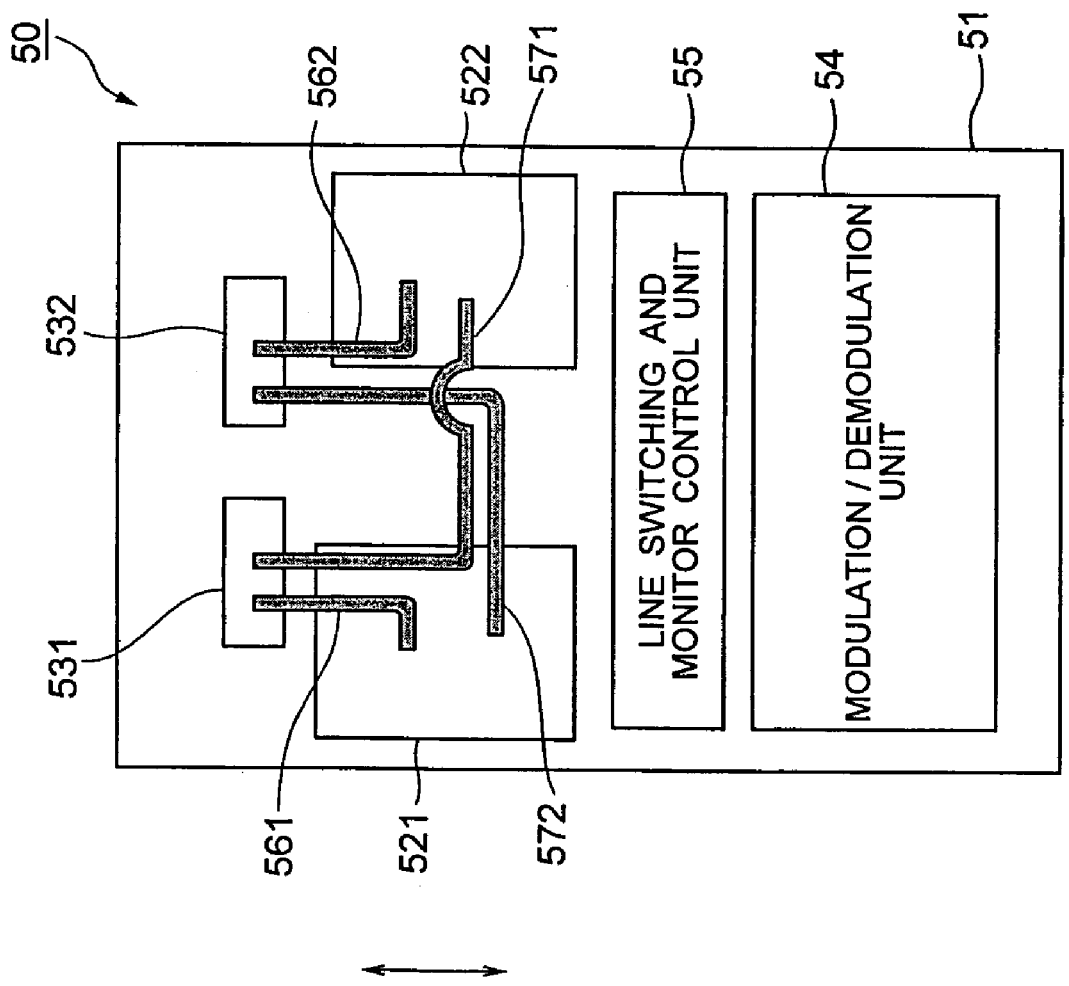
FIG. 1 is a layout diagram of respective units in a conventional communication device.
Figure 2:
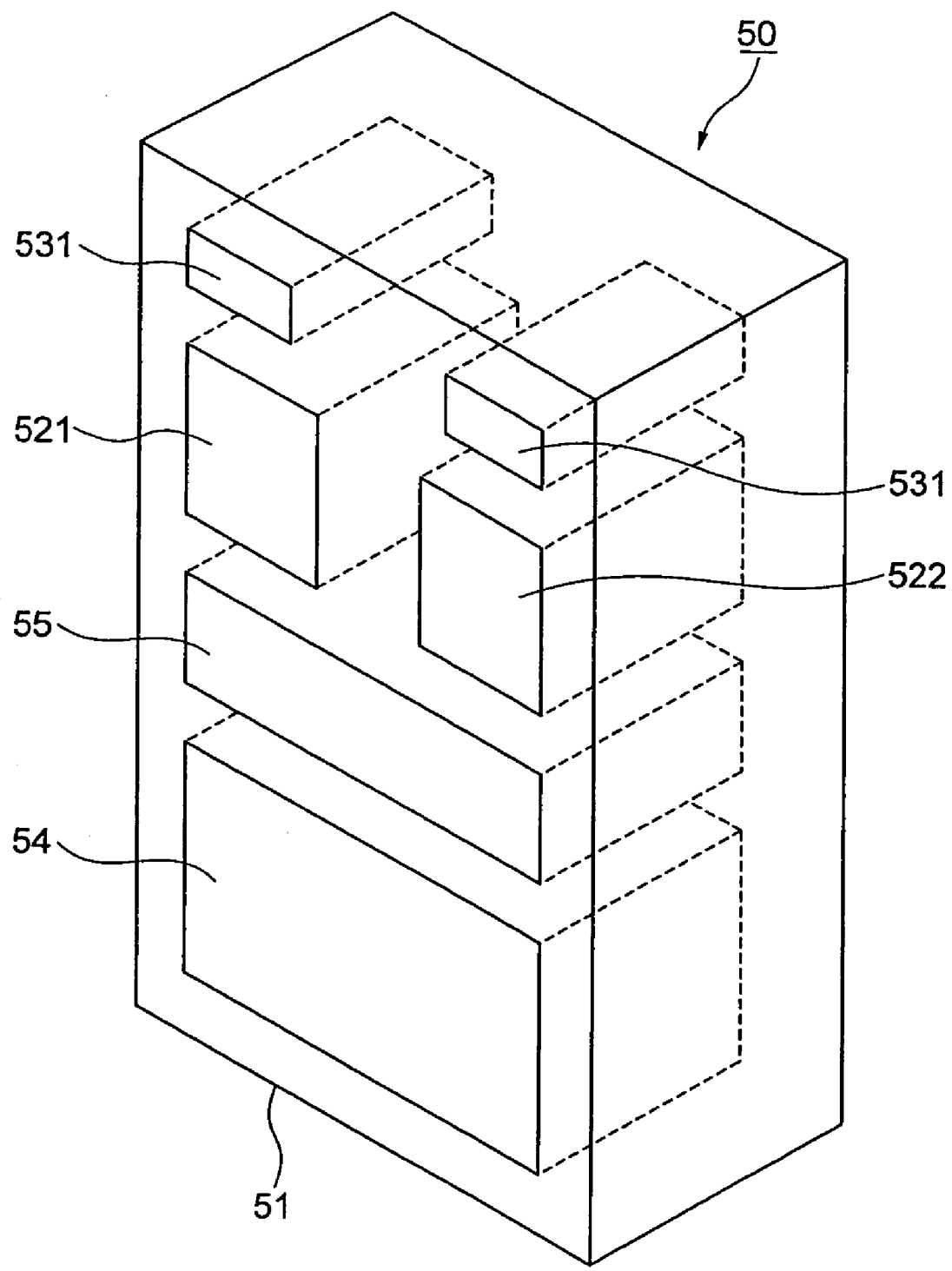
FIG. 2 is a schematic perspective view showing the conventional communication device.
Figure 3:
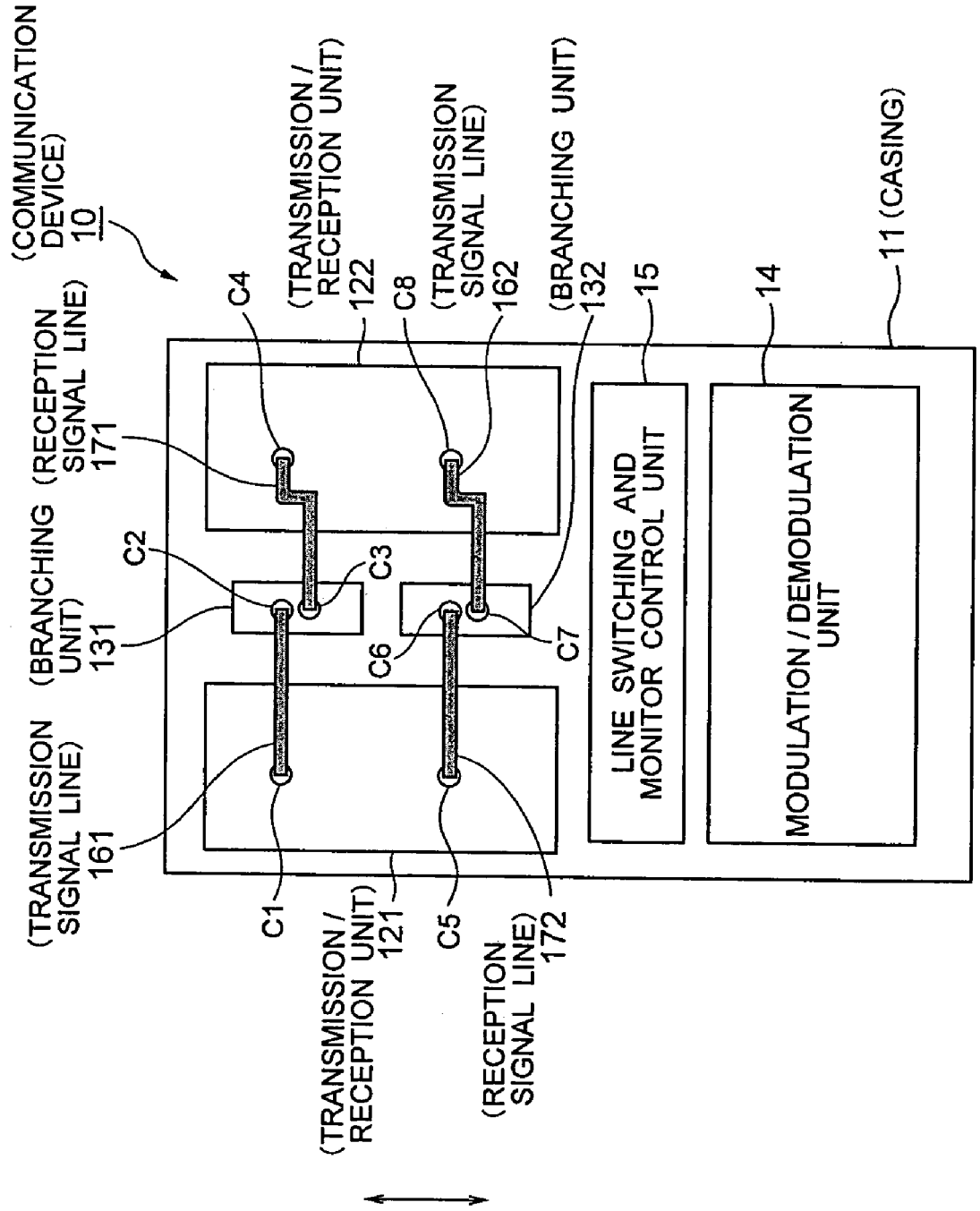
FIG. 3 is a layout diagram of respective units in a first embodiment of a communication device of the present invention.
Figure 4:
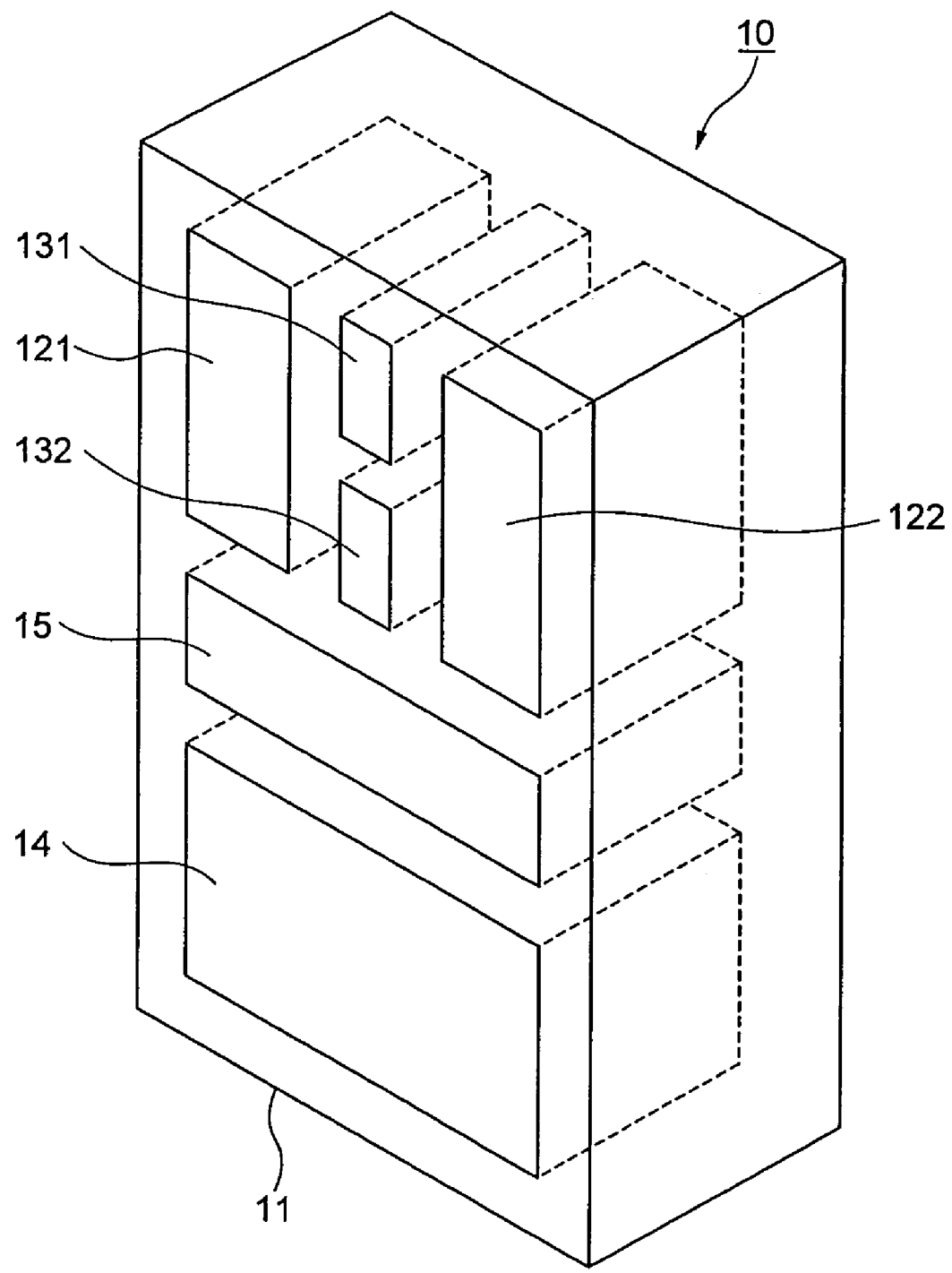
FIG. 4 is a schematic perspective view showing the first embodiment of the communication device of the present invention.

FIG. 3 is a layout diagram of respective units in a first embodiment of a communication device according to the present invention. FIG. 4 is a schematic perspective view showing the first embodiment of the communication device of the present invention. Hereinafter, explanation will be given based on these Figures.

A communication device 10 of the present embodiment has a 1+1 radio standby switching function provided with an active transmission system and one standby transmission system. In the communication device, a plurality of units, including transmission/reception units 121 and 122 of the active and standby transmission systems with high heating values and branching units 131 and 132 of the active and standby transmission systems with low heating values, are accommodated in one casing 11.

A modulation/demodulation unit 14 shown in FIG. 3 is a unit consisting of components which do not differ depending on radio frequencies, and is commonly used in the active transmission system and the standby transmission system. The modulation/demodulation unit 14 has a modulating function for modulating and converting an input baseband signal into an intermediate frequency signal, and a demodulating function for demodulating and converting an intermediate frequency signal into a baseband signal.

The transmission/reception units 121 and 122 perform transmission and reception with the same polarized wave, and have a transmitting function for converting an intermediate frequency signal from the modulation/demodulation unit 14 into a radio frequency signals and supplying it to an antenna, and a function of converting a radio frequency signal to an intermediate frequency signal and outputting it to the modulation/demodulation unit 14. Further, the transmission/reception units 121 and 122 of the active transmission system and the standby transmission system are units consisting of components which differ depending on the selected radio frequency. The components consist of semiconductor devices, and are miniaturized.

The branching units 131 and 132 of the active transmission system and the standby transmission system have a function of separating a desired radio frequency from the allocated radio frequency, and performing provision and reception of signals with the transmission/reception units 121 and 122. As for a branching unit, maintenance is performed relatively few times and the failure rate is low, so it is possible to use only one unit of the active transmission system.

The line switching and monitor control unit 15 is a unit consisting of components which do not differ depending on radio frequencies, and is commonly used in the active transmission system and the standby transmission system. The line switching and monitor control unit 15 has a line switching function for performing line switching between the active transmission system and the standby transmission system, a line control function for monitoring the line and controlling switching operation of the line switching part corresponding to the monitored state, and a monitoring function for monitoring and displaying the state of the apparatus.

The transmission/reception units 121 and 122 of the active and standby transmission systems, the branching units 131 and 132 of the active and standby transmission systems, the modulation/demodulation unit 14, and the line switching and monitor control unit 15 are incorporated in one casing 11.

Next, an arranging relationship when incorporating the plural units into the casing 11 will be described.

The modulation/demodulation unit 14 and the line switching and monitor control unit 15, commonly used in both of the active and standby transmission systems, are incorporated in the lower part of the casing 11. Here, they are incorporated such that the modulation/demodulation unit 14 is placed below and the line switching and monitor control unit 15 is placed above.

The transmission/reception units 121 and 122 and the branching units 131 and 132 of the active and standby transmission systems are incorporated in the upper part of the casing 1. Here, the transmission/reception units 121 and 122 and the branching units 131 and 132 of the active and standby transmission systems are arranged in parallel such that the branching units 131 and 132 are positioned at the center thereof. Since two branching units 131 and 132. are provided, the two branching units 131 and 132 are arranged vertically as shown in FIG. 3, and the transmission/reception units 121 and 122 and the branching units 131 and 132 of the active and standby transmission systems are arranged in parallel such that the two branching units 131 and 132, arranged vertically, are positioned at the center thereof. The casing 11 is in a lack shape for example, and the respective units are arranged therein by being fitted into or bolted.

Further, with such an arrangement that the transmission/reception units 121 and 122 and the branching units 131 and 132 of the active and standby transmission systems are arranged in parallel such that the branching units 131 and 132 are positioned at the center thereof, wiring routes formed between the branching units 131 and 132 and the transmission/reception units 121 and 122 are set to have the shortest length. Further, connectors C1 to C8 are arranged at positions where wiring routes formed between the branching units 131 and 132 and the transmission/reception units 121 and 122 become the shortest.

Then, the connectors C1, C4, C5 and C8 of the two transmission/reception units 121 and 122 and the connectors C2, C3, C6 and C7 of the two branching units 131 and 132 are connected by the transmission signal lines 161 and 162 and the reception signal lines 171 and 172, respectively.

Next, assuming that one transmission/reception unit 121 and one branching unit 131 are used as the active transmission system and the other transmission/reception unit 122 and the other branching unit 132 are used as the standby transmission system, the operation in the present embodiment of the present invention will be described.

At the time of transmission, when an input baseband signal is inputted into the modulation/demodulation unit 14, the modulation/demodulation unit 14 modulates and converts the input baseband signal into an intermediate frequency signal, and outputs the intermediate frequency signal to the transmission/reception unit 121. When the transmission/reception unit 121 receives the intermediate frequency signal from the modulation/demodulation unit 14, the transmission/reception unit 121 converts the intermediate frequency signal into a radio frequency signal, and transmits the radio frequency signal to the branching unit 131 via the transmission signal line 161.

When the branching unit 131 receives the radio frequency signal from the transmission/reception unit 121, the branching unit 131 separates a desired radio frequency signal from the allocated radio frequency signal, and transmits the separated radio frequency signal from an antenna not shown.

At the time of reception, when the branching unit 132 receives the radio frequency signal from the antenna, the branching unit 132 separates a desired radio frequency signal from the allocated radio frequency signal, and outputs the separated radio frequency signal to the transmission/reception unit 121 via the reception signal line 172. When the transmission/reception unit 121 receives the radio frequency signal from the branching unit 121, the transmission/reception unit. 121 converts the radio frequency signal into an intermediate frequency signal and outputs the intermediate frequency signal to the modulation/demodulation unit 14.

The modulation/demodulation unit 14 demodulates and converts the intermediate frequency signal from the transmission/reception unit 121 into a baseband signal.

The line switching and monitor control unit 11 monitors the line of the active transmission system, and monitors and displays the state of the apparatus. In this monitoring state, when a failure occurs in the line of the active transmission system, the line switching and monitor control unit 11 outputs an instruction to switch from the active transmission system to the standby transmission system, to the modulation/demodulation unit 14, the transmission/reception unit 122 and the branching units 131 and 132.

When switched to the standby transmission system, the aforementioned transmission and reception are performed by using the modulation/demodulation unit 14, the transmission/reception unit 122, and the branching units 131 and 132.

If one branching unit 131, for example, is failed in the monitoring stage, the line switching and monitor control unit 11 uses one transmission/reception unit 122 for transmission and the other transmission/reception unit 121 for reception. Therefore, an intermediate frequency signal from the modulation/demodulation unit 14 is signal-processed through the transmission/reception unit 122 for transmission and the branching unit 132, and then transmitted from the antenna. The radio frequency signal received by the antenna is signal-processed through the branching unit 131 and the transmission/reception unit 121 for reception, and then outputted to the modulation/demodulation unit 14.

When the transmission/reception units 121 and 122 are activated and generate large amount of heat, the heat rises toward the upper space within the casing 11. In the embodiment of the present invention, the transmission/reception units 121 and 122 and the branching units 131 and 132 of the active and standby transmission systems are incorporated in the upper part of the casing 11, and the transmission/reception units 121 and 122 and the branching units 131 and 132 of the active and standby transmission systems are arranged in parallel such that the branching units 131 and 132 are positioned at the center thereof, whereby no one is exposed to the heat from the transmission units 121 and 122. Accordingly, there is no need to take special measures against heat in the transmission/reception units 121 and 122. Further, since the transmission/reception units 121 and 122 and the branching units 131 and 132 are not arranged vertically but arranged in parallel, there is no obstacle when the heat generated from the transmission/reception units 121 and 122 rises toward the upper space of the casing 11, so that the heat naturally moves upward and discharged, whereby the discharging effect is improved comparing with the conventional case.

Further, the transmission/reception units 121 and 122 and the branching units 131 and 132 of the active and standby transmission systems are arranged in parallel such that the branching units 131 and 132 are positioned at the center thereof, and the wiring routes formed between the branching units 131 and 132 and the transmission/reception units 121 and 122 are set to have the shortest length, and the connectors are arranged at the positions where the wiring routes become the shortest. Therefore, when the transmission signal lines 161 and 162 and the reception signal lines 171 and 172 for electrically connecting the branching units 131 and 132 and the transmission/reception units 121 and 122 are cabled, the lengths of the connection cables to the active system and the standby system can be equal, so a difference between the cable losses is reduced. Further, since the wiring is simplified, the manufacturing ease in assembling the communication device 10 is also improved.

What is claimed is:

1. A communication device, comprising, in a casing:
   a modulation/demodulation unit having a modulating function for modulating and converting an input baseband signal into an intermediate frequency signal, and a demodulating function for demodulating and converting an intermediate frequency signal into a baseband signal;
   transmission/reception units of an active transmission system and a standby transmission system, each of which has a transmitting function for converting an intermediate frequency signal from the modulation/demodulation unit into a radio frequency signal and supplying it to an antenna, and a function of converting a radio frequency signal into an intermediate frequency signal and outputting it to the modulation/demodulation unit;
   a branching unit for separating a desired radio frequency from an allocated radio frequency and performing provision and reception of a signal with the transmission/reception units; and
   a line switching and monitor control unit having a line switching function for performing line switching between the active transmission system and the standby transmission system, a line control function for monitoring a line and controlling a switching operation of a line switching part corresponding to a monitored state, and a monitoring function for monitoring and displaying a state of an apparatus, wherein
   the modulation/demodulation unit and the line switching and monitor control unit, commonly used in the active transmission system and the standby transmission system, are incorporated in a lower part of the casing,
   the transmission/reception units of the active transmission system and the standby transmission system and the branching unit are incorporated in an upper part of the casing, and
   the transmission/reception units of the active transmission system and the standby transmission system and the branching unit are arranged in parallel such that the branching unit is positioned at a center thereof, thereby preventing characteristics of the branching unit from being changed by heat generated by the transmission/reception units.

2. The communication device, as claimed in claim 1, wherein the transmission/reception units of the active transmission system and the standby transmission system are units comprising components which differ depending on a selected radio frequency, and the components are formed of semiconductor devices.

3. The communication device, as claimed in claim 1, wherein the transmission/reception units of the active transmission system and the standby transmission system are used with a plurality of branching units arranged vertically, all of which are incorporated in the upper part of the casing, and
   the transmission/reception units of the active transmission system and the standby transmission system and the branching systems are arranged in parallel such that the branching units are positioned at a center thereof.

4. The communication device, as claimed in claim 1, wherein the transmission/reception units of the active transmission system and the standby transmission system and the branching unit are arranged in parallel such that the branching unit is positioned at the center thereof, so that wiring routes formed between the branching unit and the transmission/reception units are set to have a shortest length.

5. The communication device, as claimed in claim 4, wherein connectors are arranged at positions where the wiring routes formed between the branching unit and the transmission/reception units have the shortest length.

6. The communication device, as claimed in claim 1, wherein the transmission/reception units of the active transmission system and the standby transmission system perform transmission and reception with a same polarized wave.

* * * * *